Patented Apr. 17, 1934

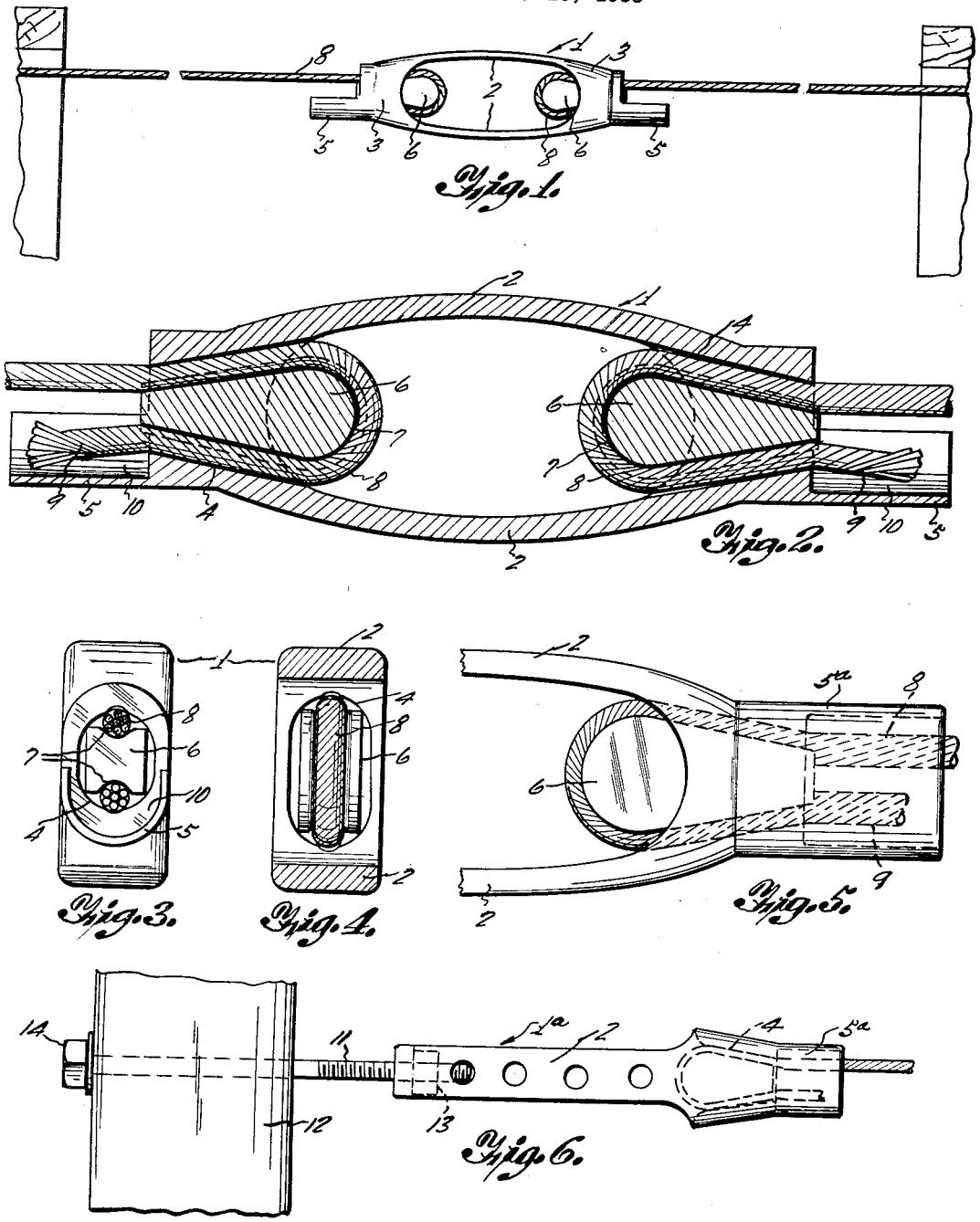

1,955,450

UNITED STATES PATENT OFFICE 1,955,450

CONNECTING CLAMP OR SPLICER FOR CABLES

Jasper Blackburn, Webster Groves, Mo.

Application February 15, 1933, Serial No. 656,803

9 Claims. (Cl. 24—126)

This invention relates to connecting clamps or splicers for the ends of wire cables or the like as commonly used in erecting telephone systems, highway guards or similar installations.

A principal object of the invention is to provide a clamp or connector having means at one or both ends for protecting the free or dead ends of the cables, which ends, if left protruding in usual manner, are sources of damage and injury to people and animals.

Another object is to provide in such a clamp or splicer an elongated open frame having a flat, tapered socket extended out axially through one end and a complemental wedge block insertible through an open side of the frame for fitting into the socket for frictionally locking an end of a cable inserted through the socket and looped over the wedge, the walls of the socket being extended outwardly to form a protecting skirt for the outer end of the wedge and the free end of the cable.

Another object is to provide in combination, an elongated frame having extended axially out through one end a tapered socket fitted with a wedge block as means for frictionally clamping a cable end extended within the socket and looped over the block, the wall of the socket being extended longitudinally outward adjacent or along the free or dead end of the cable to form a shield for covering or protecting the same.

Another object is to provide in a cable splicer or connecting clamp, an elongated open frame having tapered sockets extended longitudinally out through its ends, and wedge blocks insertible through the open frame and fitted within the sockets, whereby cable ends inserted within the sockets and looped over the blocks may be securely held or locked in place and may have their free or dead ends covered or protected by the relatively extended skirts of the socket walls.

With these and such other objects in view as may appear from the following specification, attention is directed to the accompanying drawing, which forms a part of the specification and shows a practical embodiment of the invention, and wherein Figure 1 is a side elevation of a splicer or connecting clamp constructed in accordance with this invention, and showing its use in connecting two adjacent ends of highway guard cables as extended from posts located at either side.

Figure 2 is a longitudinal section on a greatly enlarged scale, through the form of splicer shown in Figure 1, with cable ends secured within the same.

Figure 3 is an end view of the structure and assembly of Figure 2.

Figure 4 is a medial transverse section through the structure as shown in Figure 2.

Figure 5 is a detail of a modification showing in lieu of the extension of one wall only of the tapered socket to form a single protecting shield for the cable end, the extension of walls of the socket all around, to form an encircling protective skirt covering both the cable end as well as the outer end of the inserted wedge block.

Figure 6 is a side elevation on a scale reduced from Figures 2, 3 and 4, of a combination comprising an elongated frame of somewhat different form embodying a take-up arranged at one end, and a cable clamp constructed in accordance with this invention at the opposite end.

In carrying out the invention as illustrated in Figures 1, 2, 3 and 4, I provide an elongated frame 1 comprising the two spaced, upper and lower parallel bars 2, which merge at their ends into the laterally closed extremities 3. Flat, tapered sockets 4 are extended axially out through these extremities of the housing, the lateral portions of the extremities 3 forming the walls of the sockets. The inner mouths of the sockets are relatively wider than the outer mouths thereof, in other words, the sockets taper outwardly. One wall of each socket at its narrow dimension, is extended outwardly longitudinally to form a concaved shield or guard 5, these said guards or shields being extended in longitudinal alignment to each other. Complemental wedge blocks 6 are fitted to these sockets, the same being preferably provided with cable grooves 7. In the use of the structure as described, the cable ends 8 are looped through the sockets 4, and the wedge blocks 6 are then passed between the bars 2 and within the loops of the cable ends 8. The wedge blocks and cable loops are then forced into their sockets, whereby the cable ends are firmly locked in place. In this operation, the free or dead ends 9 of the cable ends are turned towards the shields 5 and disposed within the concave sides 10 thereof, the said shields or guards constituting in fact continuations of the walls of the sockets 4 at these points. Thus the said guards 5 effectually cover or protect the said dead ends 9 and obviate the necessity of winding or tying those ends, as is commonly done. These guards or shields 5 also serve to protect the outer extended ends of the wedge blocks 6 after same are driven home, so that same may not readily be knocked out by vandals or through accident.

In Figure 5 is shown a modification wherein in lieu of the extension of the socket walls of the two sockets at one point only to form the shields 5, the socket walls are extended all around to form encircling skirts 5a for covering both the cable ends 8 as well as the outer ends of the wedge blocks 6.

In Figure 6 is shown a somewhat different structure, the same comprising in combination a frame 1a of the general nature of the frame 1 already described, except that the spaced bars 2 are arranged laterally of each other instead of one above the other. This frame 1a is provided at one end with a cable clamp of the kind just described, and at the other end is provided with a take-up or tightener comprising a headed bar 11, adapted for passing through a post 12, the opposite end of the bar being screw threaded and thereby placed in engagement with a tapped nut 13, which is set within the end of the frame. The take-up is operated by merely turning up the head 14.

I claim:

1. In a device of the kind described, an elongated frame having a socket opening out through one end for engaging a wedge block, the socket wall at one outer point being extended outwardly to form a guard for a projecting cable end.

2. In a device of the kind described, an elongated frame having a socket through one end for engaging a cable wedge block and cable end looped thereover, the socket wall at one point being extended outwardly to form a guard for the projecting end of the looped cable, and a complemental wedge block for engaging the looped cable end as aforesaid.

3. In a device of the kind described, an elongated frame having a socket through one end for engaging a wedge block and cable end passed through the socket and looped over the block with the extremity of the cable directed outwardly, a complemental wedge block for so engaging the looped end of the cable and locking same between itself and the socket walls with the extremity of the cable extended outwardly, and means extended outwardly from the socket wall to cover the otherwise exposed extremity of the cable.

4. In a device of the kind described, an elongated frame having a tapered socket formed axially out through one end, a wedge block adapted to enter the socket, a cable end passed through said socket and looped over the wedge block, the extremity of the cable being directed again outwardly, and means extended from the outer margin of the socket for covering the said otherwise exposed extremity of the cable.

5. In a device of the kind described, an elongated frame having axially aligned sockets tapered outwardly through its ends, wedge blocks for the sockets, the same being adapted for engaging looped cable ends passed inwardly through the sockets with the extremities of the cables directed again outwardly, and means extended from the outer margins of the sockets for covering the extremities of the cables and the outer ends of the wedge blocks.

6. In a device of the kind described, an elongated frame having a socket tapered outwardly through each end, wedge blocks for the sockets and for receiving cable ends looped thereover through the sockets, and guards extended from the outer margins of the sockets and covering the outer ends of the wedge block and cable ends.

7. In a device of the kind described, an elongated frame having a socket tapered outwardly through one end, a wedge block for the socket and for receiving and locking a looped cable end passed into the socket and arranged over the block, and a shield extended at the outer mouth of the socket for covering any element projecting outwardly through the socket.

8. In a device of the kind described, an elongated frame having a socket tapered outwardly through one end, a wedge block for the socket and for receiving and locking a looped cable end passed into the socket and arranged over the block, a shield extended at the outer mouth of the socket for covering any element projecting outwardly through the socket, and a take-up mechanism arranged at the opposite end of the frame.

9. In a device of the kind described, an elongated frame having an opening formed out axially through one end for engaging the looped end of a flexible cable, the wall of the opening being extended outwardly to form a guard for the returned end of the cable, and means for locking the looped cable end within said opening.

JASPER BLACKBURN.